Feb. 8, 1966   J. MIHALYI   3,233,326
GRASS SHEARS
Filed Jan. 26 1965
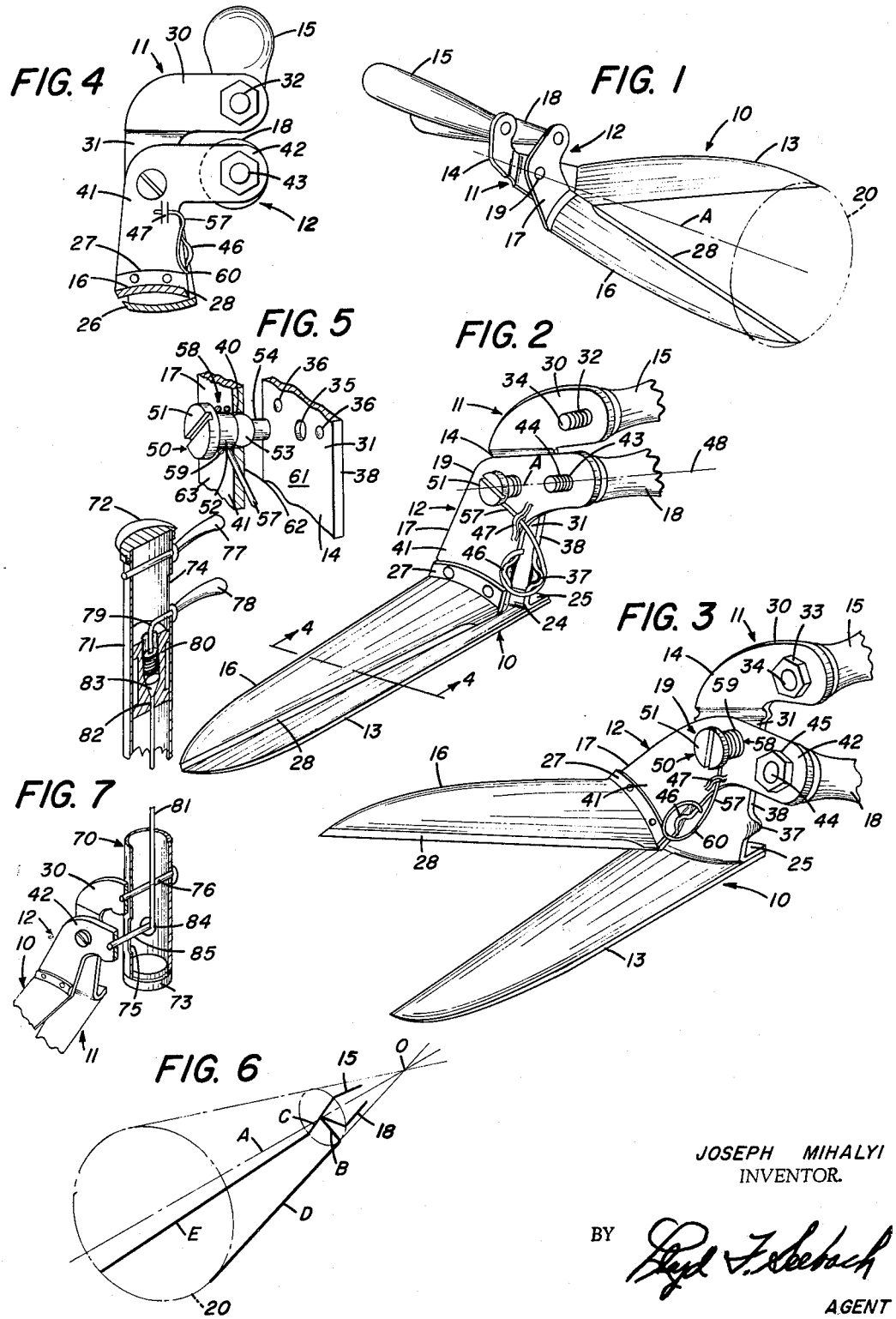
JOSEPH MIHALYI
INVENTOR.
BY 
AGENT

3,233,326
GRASS SHEARS
Joseph Mihalyi, 76 Van Voorhis Ave.,
Rochester 17, N.Y.
Filed Jan. 26, 1965, Ser. No. 428,047
12 Claims. (Cl. 30—248)

The present invention relates to a grass shears and more particularly to a grass shears comprising a fixed element and a movable element that are pivotally mounted for movement about an axis that is angularly disposed with respect to the blades of each element to provide an improved cutting action.

It is well known in many types of grass shears to provide means for maintaining the blades in contact at all times as the movable blade moves with respect to the fixed blade so that a cutting action is maintained throughout the length of the blades. In known types of grass shears, such means comprises merely a nut on the pivotal stud with a strong tension spring under the nut which forces the blades into closer and tighter contact, thereby increasing the cutting action of the blades. Such grass shears may also include a resilient member that counteracts the spring tension applied to the blades per se to permit separation of the blades in the event an uncuttable foreign substance is encountered by the blades. The more expensive types of grass shears include complex linkages to achieve a horizontal shearing action with a vertical operation of the handles, and pressure elements that are interconnected between the blades for maintaining them in intimate cutting contact throughout their length, as well as for moving the movable blade laterally relative to the fixed blade in order to increase the cutting action of the blades when a heavy foreign substance is engaged by the blades.

Generally speaking, grass shears are of two types. First, those in which the blades are arranged for movement in a substantially horizontal plane by means of handles that are actuated in a substantially vertical direction. This type requires that a mechanism be provided for translating the vertical actuating motion into a horizontal motion for moving or actuating the blades. Secondly, those in which the blades as well as the actuating handles are arranged for movement in a substantially horizontal plane, but with the blades arranged in a plane that is displaced from and parallel to that in which the handles are arranged and movable. Both of these types require that a part of the operating force be used to overcome the spring tensions and, hence, do not lend themselves to comfortable operation in that actuation of the handles is not compatible with a natural opening and closing of the human hand. Further, in order to obtain an optimum cutting action, the mechanisms that are added to the shears make their cost relatively high in comparison with the purpose for which the shears are intended.

The disadvantages of those shears which form the prior art are overcome by the shears disclosed and described in the present application in that an optimum cutting action is obtained by a relatively simple arrangement which permits all of the force applied to the movable blade to be used for moving it relative to the fixed blade during a normal cutting action and which permits the movable blade to pivot in a direction to provide lateral movement thereof with an increased cutting action when a foreign substance is encountered by the blades. Further, the shears comprise only two main elements, each of which, aside from the handles, can be readily formed as a single piece, or at most, two individual pieces. The relation of the blades to the pivotal axis of the blades, as well as the arrangement of the handles, is considered to be unique in that the arrangement and action are based on a conical concept. This concept provides a shears structure that comprises very few parts, that is feasible to manufacture, that is easily operated without fatigue in that the actuating action is compatible with the normal opening and closing of the human hand, and that provides an optimum cutting action without the necessity of expending energy to overcome any spring action during the cutting action.

The primary object of the invention is to provide a shears which comprises only a few parts and which provides an optimum cutting action.

Another object of the invention is to provide a shears having the blades and handles arranged with respect to the pivotal axis for the blades so that the blades as well as the operating handle move through a portion of a substantially conical plane.

Still another object of the invention is to provide a shears having a compound pivotal connection between the fixed and movable blades such that the movable blade moves across the fixed blade with a normal cutting action when operating under normal conditions and is also pivoted in a lateral direction relative to the fixed blade when an abnormal condition exists.

And yet another object of the invention is to provide a shears that is simple in construction, comprises only a few parts and is relatively inexpensive in cost.

These and other objects and advantages of the invention will be readily apparent to those skilled in the art by the description which follows.

The shears about to be described in more detail hereinafter comprise a fixed member and a movable member, each of which comprises a cutting blade, an intermediate portion and a handle. The blade in each instance is arranged at an angle to and extends in one direction from the intermediate portion which is provided with an aperture whose axis is perpendicular to the intermediate portion and angularly disposed with respect to the blade. The handle extends in the other direction from the intermediate portion. When the fixed and movable members are in an assembled relation, the movable member overlies the fixed member and a resilient member serves only to maintain the blades in a separated or open position. Upon movement of the handles toward each other, when the blades are in an open position, the movable blade moves over the fixed blade and generates a portion of a conical frustrum surface, the conical axis being the pivotal axis and, since the blades are angularly disposed relative to the intermediate portion, the movable blade forms, in effect, the line that generates such a conical surface. As will be described in more detail, each blade must be disposed relative to its respective intermediate portion at an obtuse angle, that is, an angle greater than 90° and less than 180° in order to generate such a surface. The optimum angle is dependent on the size of the shears and the corresponding and necessary hand clearance. Due to the fact that the movable blade is mounted on a spherical pivotal member and the intermediate portions are maintained in a separated position by means on one of the intermediate portions and in relation to the pivotal axis of the blades, the movable blade can be moved not only across the fixed blade, but also pivoted in a lateral direction when an abnormal cutting condition is encountered, thereby moving the blades not only into more intimate contact but, in effect, also sliding the movable blade relative to the fixed blade to provide an additional cutting force.

Reference is now made to the accompanying drawing wherein like reference numerals and characters designate like parts and wherein:

FIG. 1 is a perspective view of a shears in accordance with the invention showing the relation of the principal elements;

FIG. 2 is a perspective view of a shears with blades in a closed and locked position;

FIG. 3 is a perspective view of a shears with the blades in an open position;

FIG. 4 is a sectional view taken substantially along line 4—4 in FIG. 2;

FIG. 5 is a detail perspective view of the pivotal connection joining the intermediate portions of the fixed and movable members.

FIG. 6 is a diagrammatic view showing the angular relationships between the blades, intermediate portions and operating handles; and FIG. 7 is a perspective view showing an arrangement by which the shears can be actuated by an extension member.

With reference to the drawing and particularly FIG. 1, a shears, generally designated by the numeral 10, comprises a fixed element 11 and a movable element 12. The fixed element 11 includes a cutting blade 13, an intermediate portion 14 and a handle 15. Likewise, the movable element 12 includes a cutting blade 16, an intermediate portion 17 and a handle 18. In an assembled relation, the intermediate portions 14 and 17 are arranged adjacent one another and are joined for coaction by a pivotal connection designated by the numeral 19. Due to the arrangement of the pivotal connection with respect to the fixed and movable elements, and the end of the cutting blade 16 moves in an arcuate path, as shown by the dotted line 20, which is, in effect, an arc of the base of a right circular cone, as described more fully hereinafter.

Each of the cutting blades 13 and 16 is made from a piece of thin metal that is formed with a curved cross section to lend rigidity with light weight to the blade, see FIGS. 2–4. The cutting blade 13 is secured at its rear end 24 to a formed over end 25 of intermediate portion 14 by means of rivets, spot welds, or any other suitable fastening arrangement. The left-hand or cutting edge of blade 13 is beveled, as shown at 26 in FIG. 4. On the other hand, the cutting blade 16 is provided with an upward extension 27 that is secured to the lower end of intermediate portion 17 in the same manner as described above as to blade 13. The righthand or cutting edge of blade 16 is beveled, as shown at 28 in FIGS. 2–4.

Intermediate portion 14 is provided with an arm 30 that is formed forward of the central portion 31, that is between arm 30 and the end 25. The arm 30 extends to the right, as seen in FIGS. 2–4 and is provided with an aperture 32 for fastening the handle 15 thereto by means of a nut 33 that engages a threaded stud 34 secured to or integral with the handle. The central portion 31 is provided with an aperture 35, the axis of which is perpendicular to portion 31, and a pair of protuberances 36, each of which is located above and to one side of the aperture. Such protuberance can be formed from the central portion or can be a head of a rivet, screw or similar means for providing a means to maintain intermediate portions 14 and 17 in spaced relation when in an assembled relation for a purpose to be described hereinafter. A rearwardly extending lug 37 is formed along an edge 38 of the central portion 31.

The intermediate portion 17 is provided with an aperture 40 whose axis is perpendicular to a central portion 41 and an arm 42 that is coplanar with said central portion and extends to the right thereof, as seen in FIGS. 1–4. The arm is provided with an aperture 43 for receiving a stud 44 that is secured to or integral with handle 18, the stud being secured by a nut 45 when the stud is inserted in aperture 43. The central portion 41 is provided with a forwardly formed lug 46 and a struck-out strip 47 for a purpose to be described hereinafter.

The pivotal connection 19 comprises a stud 50 having a head 51, a cylindrical shank 52, a spherical shank 53 and a securing shank 54. The spherical shank is journaled in the aperture 40 in central portion 41 and the securing shank 54 is received by aperture 35 in central portion 31 and secured to the latter as by peening over the end thereof.

In an assembled relation, the movable element 12 is arranged over the fixed element 11 with the intermediate portions 14 and 17 adjacent one another and arms 30 and 42 extending in the same direction, namely, to the right of the axis 48 of stud 50. With elements 11 and 12 in this relationship, a tail 57 of a spring 58 is first passed under the strip 47 and stud 50 is inserted in the coils 59 formed in one end of the spring 58, the end of coils 59 being secured to stud 50 in any suitable manner. Stud 50 is then moved through apertures 40 and 35 with shank 53 engaging aperture 40 and shank 54 entered in aperture 35, the end of shank 54 then being peened over to secure the fixed element 11 and movable element 12 in a pivotal relationship. The end of tail 57 is formed into a loop 60 that is sufficiently large to engage both of the lugs 37 and 46 so as to to hold the blades 13 and 16 in a closed position, as shown in FIG. 2. When loop 60 is disengaged from lug 37, the force exerted by tail 57 is only sufficient to move the movable element 12 to an open position and has no effect on the blades during a cutting action. The open position of movable element 12 is controlled by handle 18 abutting the edge 38 of central portion 31. By grasping the handles 15 and 18 and moving handle 18 toward handle 15, the blade 16 is moved over and against blade 13 and, upon releasing the handle 18, tail 57 moves the movable element 12 into its open position relative to the fixed element 11.

With reference to FIG. 5, the spherical shank 58 is longer than the thickness of central portion 41. As a result, when shank 54 is peened over, the surface 61 of central portion 31 abuts the shoulder formed by shanks 53 and 54. However, the surface 62 of central portion 41 cannot be brought up against surface 61 due to the protuberances 36 and is held thereagainst by the action of coils 59 which are slightly compressed between head 51 and a surface 63 of central portion 41. The protuberances 36 and shank 53 therefore provides a compound pivotal connection for the movable element 12.

As described above, the axis of each of apertures 35 and 40 is perpendicular to its respective central portion and these axes are common to that of stud 50 when the fixed element 11 and the movable element 12 are in an assembled relation. Since blades 13 and 16 are angularly disposed with respect to such a comon axis, designated by A, and central portions 31 and 41 are perpendicular to this axis, it can be readily seen, as shown diagrammatically in FIG. 6, that lines B and C representing said portions and lines D and E representing blades 13 and 16 are, respectively, the axes of, radii in a plane parallel to the base of, and lines in the external surface or plane of a frustrum of a right circular cone. Accordingly, as line C is moved about axis A, line E generates a portion of a surface of a conical frustrum dependent on the angular movement of line C and the end of line E moves through a corresponding circular arc 20. The angular arrangement of each blade to its respective central portion must therefore be that of an obtuse angle, that is greater than 90 degrees and less than 180 degrees. It has been found that such an angle of approximately 110 degrees provides a workable angle for a hand shears. One of the factors to be considered is that the angle must be sufficient to provide operating clearance in that for trimming grass with the blades substantially parallel to the ground, the axis A is angularly disposed with respect to the ground, thereby making the choice of the angle of considerable importance. However, this angle is also dependent on the size of the shears and the length of the radii B and C. As result, the handles 15 and 18 must be confined within the conical surface generated by the fully extended line E with respect to axis A, in other words, the right circular cone generated by the side OE of the angle EOA. It has been found that a satisfactory arrangement of handles 15 and 18 for a grass shears, as described above, is one in which the axis of handle 15 lies in a vertical plane spaced from and substantially parallel to a vertical plane passing through the pivotal axis A and at a diverging angle in said plane with respect to axis A of approximately 15 degrees and the axis of handle 18 lies in a horizontal plane spaced from and substantially parallel to a horizontal plane passing through the pivotal axis A and at a converging angle in said plane with respect to axis A of approximately 10 degrees, as viewed in FIG. 4.

Under normal cutting conditions coils 59 of spring 58 merely hold the movable element 12 against protuberances 36 and as described above with respect to tail 57 have no affect on blades 13 and 16 as they are moved relative to one another. When a foreign substance, such as stem of a leaf, a small twig, etc., is encountered by the blades, additional force is applied to the handle 18 and such force causes the movable element 12 to pivot not only about stud 50 but also about protuberances 36. By this action, blade 16 not only moves across but also slides relative to blade 13 due to the additional force applied to handle 18 which causes the arm 42 to be moved in an upward direction thereby moving the blade 16 in a rearward direction and at the same time increasing the force with which blade 16 acts on blade 13. This can be accomplished because aperture 40 in the central portion 41 receives the spherical shank 53 which permits the movable element 12 to pivot thereabout in a lateral direction. If the foreign substance is cut, the force can immediately revert to that supplied by the coils 59 of spring 58.

It can be readily appreciated that the embodiment of the invention described hereinabove possesses many advantages and is simple in structure. While blades 13 and 16 have been disclosed as being made of thin metal for lightness and formed in arcuate cross section to provide rigidity, they can also be made of flat stock without detracting from the merits of the structure. Likewise, it should be pointed out that the fixed and movable elements can be made as integral unis by suitable tooling procedures, each blade and its respective intermediate portion can be made as a unit with separate handles or each intermediate portion and its respective handle can be made as a unit with a spearable blade. With any of these constructions, there is no change in the arrangement, in the operation, or in the cutting action.

The embodiment of the invention disclosed in the drawing, readily lends itself to operating the shears by means of an extension 70 that it attached to arms 30 and 42 when the handles 15 and 18 are removed, see FIG. 7. The extension 70 comprises a tube 71 that is closed at the ends by caps 72 and 73 and provided with a pair of elongated slots 74 and 75, a lower pair of diametric apertures through which a bolt 76 is inserted for receiving arm 30 of the fixed element 11, and an upper pair of diametric apertures for receiving and securing the fixed handle 77. A movable handle 78 is secured to a formed rod 79 that passes through slot 74 and threadably engages a slidable sleeve 80 arranged within tube 71. A long rod 81 passes through an aperture 82 in sleeve 80 and has an upset portion 83 at one end and a loop 84 formed at the other end. The upset portion 83 is retained in aperture 82 by the threaded end of rod 79, as shown in FIG. 7. The loop 84, which is offset to circumvent bolt 76, engages an auxiliary stud 85 that is secured to arm 42 of the movable element 12 and inserted through slot 75 at the time arm 30 is positioned on bolt 76. By moving handle 78 relative to handle 77, the movable element 12 is moved relative to fixed element 11, the spring 58 serving to return the movable element 12, as well as the handle 78, to their original positions such that blades 13 and 16 are in the open position as seen in FIG. 4. Since the relation between the fixed element 11 and the movable element 12 has not been changed, the latter can pivot and move laterally as described above.

The invention has been described in detail with particular reference to a preferred embodiment thereof, but it will be understood that variations and modifications can be affected within the spirit and scope of the invention as described hereinabove and as defined by the appended claims.

I claim:
1. A shear comprising in combination:
   a fixed member having a substantially planar intermediate portion provided with a first aperture having an axis substantially perpendicular to said intermediate portion, a first cutting blade extending in one direction from said intermediate portion substantially in a plan at an obtuse angle to the plane of said intermediate portion and offset from the axis of said first aperture along a first radius thereof, and a first handle extending in the other direction from said intermediate portion and offset from said first aperture along a second radius thereof that is angularly spaced from said first radius;
   a movable member having a substantially planar central portion provided with a second aperture having an axis substantially perpendicular to said central portion, a second cutting blade extending in said one direction from said central portion substantially in a plane at an obtuse angle to the plane of said central portion and offset from the axis of said second aperture along a third radius thereof, and a second handle extending in said other direction from said central portion and offset from said second aperture in substantially the same direction as said first handle along a fourth radius thereof that is angularly spaced from said third radius by an angle that is less than that between said first and second radii; and
   a pivotal element engaging said first and second apertures for pivotally mounting said fixed and movable members in cooperating relation with said intermediate portion adjacent said central portion;
   whereby said second cutting blade moves through a substantially conical frustrum plane upon movement of said second handle toward and away from said first handle.

2. A shear in accordance with claim 1 wherein one of said cutting blades has a concave cross section throughout its length and the other of said cutting blades has a convex cross section throughout its length.

3. A shear in accordance with claim 1 wherein said first cutting blade has a cross section of continuously decreasing concavity from said intermediate portion to its end and said second cutting blade has a cross section of continuously decreasing convexity from said central portion to its end.

4. A shear in accordance with claim 1 wherein said first and second handles are angularly disposed relative to their respective intermediate and central portion so that said handles are wholly within the conical region generated by the acute angle formed by said second cutting blade with the axis of said pivotal element when said second cutting blade is moved toward and away from said first cutting blade.

5. A shear in accordance with claim 1 including a resilient member arranged on said pivotal element and having an end engaging said movable member for urging the latter into an open position relative to said fixed member.

6. A shear in accordance with claim 1 including a first lug formed along one edge of said intermediate portion, a second lug formed along a corresponding edge of said central portion and a resilient member arranged on said pivotal element and having an end for selectively engaging said first lug to urge said movable member into an open position relative to said fixed member and said first and second lugs to retain said movable member in a closed position relative to said fixed member.

7. A shear in accordance with claim 1 wherein said pivotal element is provided with a spherical bearing portion for engaging said aperture in said central portion.

8. A shear in accordance with claim 7 including fulcrum means arranged on one of said intermediate portion and said central portion on the side of said pivotal element opposite said blades for engaging the other of said intermediate portion and said central portion so that said movable member is held in spaced relation from said fixed member and is movable about said spherical bearing portion relative to said fixed member to increase the contact pressure between said first and second cutting blades.

9. A shear in accordance with claim 1 wherein said intermediate portion comprises a substantially inverted L-shaped member whose leg is above said aperture therein and extends in one direction and said central portion comprises a substantially inverted L-shaped member whose leg is substantially opposite said aperture therein and extends in said one direction spaced from said leg of said intermediate portion.

10. A shear in accordance with claim 1 wherein each of said first and second cutting blades extends from its respective intermediate and central portion at an obtuse angle that is measured in a plane passing through said pivotal element and said first and second radii when said first and second cutting blades are in a closed position.

11. A shear in accordance with claim 9 wherein the axes of said first and second handles extend from their respective leg at an angle such that said handles are within an extension of said conical frustrum plane.

12. A shear in accordance with claim 11 wherein said second handle engages said intermediate portion to control the position of said movable member relative to said fixed member in both an open position and a closed position.

References Cited by the Examiner
UNITED STATES PATENTS

| | | | |
|---|---|---|---|
| 173,977 | 2/1876 | Lyman | 30—257 |
| 452,716 | 5/1891 | McKee | 30—257 |
| 915,697 | 3/1909 | Polley | 30—259 |
| 1,594,671 | 8/1926 | Issaac | 30—259 |
| 1,886,273 | 11/1932 | Thomson | 30—266 |

FOREIGN PATENTS 10,544  1891  Great Britain.

WILLIAM FELDMAN, *Primary Examiner.*

MILTON S. MEHR, *Examiner.*